United States Patent [19]

Sauer et al.

[11] 3,844,862

[45] Oct. 29, 1974

[54] A METHOD OF COATING FABRICS WITH POLYURETHANE

[75] Inventors: Richard W. Sauer; Donald H. Russell, both of Cherry Hill, N.J.

[73] Assignee: Atlantic Richfield Company, New York, N.Y.

[22] Filed: Oct. 20, 1972

[21] Appl. No.: 299,524

[52] U.S. Cl. ......... 156/78, 117/135.5, 117/138.8 D, 156/238, 161/88, 161/190, 260/2.5 AT, 260/2.5 BD, 260/77.5 AT, 264/45, 264/51
[51] Int. Cl. ............................................. B32b 5/18
[58] Field of Search ...................... 156/78, 79, 238; 117/135.5, 138.8 D; 260/22 R, 2.5 AT, 2.5 BD, 77.5 AT; 264/45, 51; 161/88, 190

[56] References Cited
UNITED STATES PATENTS

| | | | |
|---|---|---|---|
| 3,531,425 | 9/1970 | Burk et al. | 260/22 R |
| 3,539,424 | 11/1970 | Tashlick | 156/238 |
| 3,607,593 | 9/1971 | Semenzato | 156/78 X |
| 3,748,217 | 7/1973 | Mar et al. | 156/78 X |

*Primary Examiner*—Edward G. Whitby
*Attorney, Agent, or Firm*—Coleman R. Reap

[57] ABSTRACT

A coated fabric is prepared by coating a one-package cyclic nitrile carbonate/polyol/catalyst system with appropriate fillers and pigments onto a release surface, such as a teflon coated surface, heating the coating at an elevated temperature to cause foaming and partial gelling or curing of the film, placing a substrate fabric over the partially foamed and cured coating, applying pressure to the surface of the fabric-covered coating sufficient to crush the thermoplastic foam and allow the same to fuse into a continuous film, heating the resulting laminate to finish cure the foamed coating, and, finally, stripping the release surface from the finished coated fabric.

10 Claims, No Drawings

A METHOD OF COATING FABRICS WITH POLYURETHANE

BACKGROUND OF THE INVENTION

The present invention relates to the preparation of a fabric coating. In a specific aspect, the present invention relates to a method of preparing coated fabrics by coating the fabrics with cyclic nitrile carbonate/polyol systems.

It is known in the art to prepare unsupported polyurethane films and laminates by coating from a solution of a polyurethane resin. Thus, laminates comprising a film of a polyurethane polymer on a substrate, such as a fabric, are made by treating the fabric with a polyurethane lacquer, i.e., a solution of a polyurethane resin and a volatile solvent, and then removing the solvent to form a polyurethane film on the fabric. Such processes employing a solvent are successful only when used to deposit thin films of a polyurethane resin. Further, the resin solutions cannot be applied to highly absorbtive substrates, such as paper, because they wick rapidly through such substrates. Also, the cost of such finished laminates is relatively high.

U.S. Pat. No. 3,330,713 suggests a method for coating textile fabrics by extruding a film of an uncured polyurethane composition onto a continuous moving sheet of paper coated with a release layer of wax, partially curing said composition by heating, contacting the partially cured film under pressure with the textile fabric to be coated, heating the laminate thus formed to complete the cure of the polyurethane, and separating the laminate from the wax coated paper sheet. The polyurethane compositions are prepared by combining a crosslinking agent, such as a polyol or a polyamine, with a prepolymer formed from an aromatic or aliphatic diisocyanate reacted with a polyether, polyester, or polyamine. The prepolymer is a reaction product containing at least two terminal or substantially terminal isocyanate groups and is cured by reaction with the crosslinking agent in the presence of a catalyst, such as an organotin compound. An exemplary final cure time for the compositions of U.S. Pat. No. 3,330,713 is 1 hour at 100°C.

The difficulties encountered in attempting to put this method into practice are discussed in U.S. Pat. No. 3,278,667. For example, the pot life of the polyurethane compositions is usually so short that fouling of the coating apparatus occurs because of premature curing. If pot life is extended by employing slow-curing resins, then the required time for a final cure of the laminates becomes unfeasibly long. These problems have heretofore made utilization of conventional coating apparatus like that discussed in U.S. Pat. No. 3,330,713 difficult or impossible. Indeed, U.S. Pat. No. 3,278,667 purportedly solves these problems by resort to special methods and to apparatus of unconventional construction.

Also, in U.S. Pat. No. 3,539,424, a special coating mixture is prepared, comprising a first isocyanate prepolymer component which is the reaction product of an organic diisocyanate and a glycol and a second polyol component which is a reaction product of an organic diisocyanate and diol-triol mixture, to form a quick-curing polyurethane composition having a long pot life. This composition is then applied to a release surface, the coating is partially cured, the partially cured film is contacted with a material, such as a fabric, to be laminated thereto, and, finally, the resin is cured on the laminate. However, it is obvious from the description of this patent that a special coating composition is necessary. Further, these compositions when applied to fabric coatings as taught in this patent, do not produce a breathable product.

While the problem of forming a breathable fabric coating can be solved by the use of polyurethane foams as a coating material, particularly foams produced by a cyclic nitrile carbonate/polyol reaction system, the use of the latter type of coating introduces further difficulties. Under normal coating conditions, cyclic nitrile carbonate-based fabric coatings are found to be relatively weak and poor in abrasion and pick resistance due to the formation of a foam having a linear urethane structure which, in turn, is caused by entrapment of the carbon dioxide released by reaction of the cyclic nitrile carbonate with the polyol.

It is therefore an object of the present invention to provide an improved technique for producing a coated fabric. Another object of the present invention is to provide an improved technique for producing a tough, abrasion resistant and pick resistant coated fabric. Still another object of the present invention is to provide an improved process for producing a breathable, microporous fabric coating. Yet another object of the present invention is to provide an improved technique for producing a breathable coated fabric which is also resistant to liquid water penetration. Another and further object of the present invention is to provide an improved technique for the production of a coated fabric which is breathable, resistant to liquid water penetration, is tough and resists mechanical abrasion and picking. Another and further object of the present invention is to provide an improved technique for producing a coated fabric having desirable physical and aesthetic properties. Another and further object of the present invention is to provide an improved technique for producing a cyclic nitrile carbonate-based fabric coating. A further object of the present invention is to provide an improved technique for producing a fabric coating based on a one-package cyclic nitrile carbonate/polyol system. These and other objects and advantages of the present invention will be apparent from the following detailed description.

SUMMARY OF THE INVENTION

A method of preparing a coated fabric, comprising applying a one-package cyclic nitrile carbonate/polyol/catalyst system to a release surface, heating the coated release surface to an elevated temperature for a time sufficient to cause foaming and partial curing of the coating, placing a substrate fabric over the foamed coating, and applying sufficient pressure to the fabric covered coating to crush and densify the foam and fuse it into a continuous film, heating the resulting laminate at a temperature and for a time sufficient to finish cure the coating, cooling the laminate and stripping the release surface from the coated fabric.

DETAILED DESCRIPTION OF THE INVENTION

In accordance with the present invention, tough, abrasion resistant, but breathable or microporous fabric coatings are produced by an improved technique for applying a one-package cyclic nitrile carbonate/polyol system to the fabric.

The present invention provides a technique for applying such fabric coatings which are free of the above-mentioned problems and which produce desirable physical and aesthetic properties in the coated fabric.

The technique of the present application involves the following steps:
A. A one-package cyclic nitrile carbonate (adipodinitrile carbonate, etc.)/polyol/catalyst system with appropriate fillers and pigments is applied to a release surface, such as teflon, to the desired thickness.
B. The coating is heated at elevated temperature to cause foaming and partial gelling or curing of the film.
C. A suitable substrate fabric is placed over the partially cured and foamed coating and this laminate is put under nominal contact pressure to crush the thermoplastic foam and allow it to fuse into a continuous film.
D. The laminate is then finish cured, e.g., in a curing oven and thereafter the finished coated fabric is stripped from the release surface.

Fabric coated by this technique has been found to be breathable (air and cigaret smoke can be blown through the coating) yet it is resistant to liquid water penetration and the coating is tough and resists mechanical abrasion and picking.

Suitable cyclic nitrile carbonate/polyol/catalyst systems for use in the present technique are disclosed in U.S. Pat. Nos. 3,531,425 and 3,652,507 and 3,702,320. Accordingly, the disclosures of these patents are incorporated herein by reference. The previously mentioned patents also set forth suitable one-package cyclic nitrile carbonate/polyol/catalyst systems. A particularly useful one-package cyclic nitrile carbonate/polyol/catalyst system is also described in U.S. application Ser. No. 299,525 filed in the U.S. Pat. office on Oct. 20, 1972 by D. H. Russell, which disclosure is also incorporated herein by reference.

If desired, surface active agents may be used, for instance, in concentrations of about 0.1–5 percent by weight of the reactants to stabilize the foam. Generally useful are silicone emulsifiers and non-ionic surface active agents, such as condensates of ethylene oxide with vegetable oils, alcohols or organic acids.

Also, in accordance with the usual practice, inert, inorganic or organic fillers, or both, and pigments may be added to the coating composition. Suitable inert, inorganic materials include, for example, clay, talc, silica, carbon black, asbestos, glass, mica, calcium carbonate, antimony oxide and the like. Organic fillers include, for example, the various polymers, copolymers and terpolymers of vinyl chloride, vinyl acetate, acrylonitrile, acrylamide, styrene, ethylene, propylene, butadiene, divinylbenzenes, etc. Other additives which may be included are plasticizers, such as dioctylphthalate and di(2-ethylhexyl) adipate, extenders, softeners, and emulsifiers.

Curing catalysts for use in the present invention include a wide variety of known materials. By way of example, the following may be utilized: diazobicyclo-octane (sold by Air Products and Chemicals under the trademark DABCO), dibutyltin dilaurate (sold by Metal and Thermite Chemicals Corp. under the trademark T-12), a solution of diazobicyclo-octane and propylene glycol (sold by Metal and Thermite Chemicals Corp. under the trademark 33 LV), stanous octoate (Air Products and Chemicals' T-9, zinc octoate, etc.

The coating composition may be applied to the release surface in any desired manner, e.g., it may be sprayed or doctor bladed on the release surface to form films which may be from less than about 1 mil in thickness to as thick as 250 mils. However, film thicknesses of about 8 to 10 mils are preferred. The fabric may be laminated to the coating material by any desired method, as by gluing, but it is convenient to effect the desired bonding between the fabric and the foamed coating by the application of pressure, preferably in the step in which the foamed coating is crushed and densified.

The temperature and time utilized in Step B of the procedure set forth above are sufficient to cause foaming of the coating. In general, the higher the temperature, the shorter the time period necessary to obtain the desired result. It is preferred, of course, to use the shortest time cycle that will be sufficient to effect the desired degree of foaming and it is desired that the temperature be maintained sufficiently high to complete the foaming step in less than 5 minutes. It has been found that when temperatures in the range of about 80° to 200° C. are used the time interval necessary to produce the desired degree of foaming varies from about 20 to about 1 minute. Temperatures greatly in excess of about 200° C. cause the fabric covering material to deteriorate and char. It is preferred to heat the coating systems for about 1 to 5 minutes at a temperature of about 120° to 150° C.

The contact pressure utilized in carrying out Step C of the process is sufficient to crush the thermoplastic foam formed in Step B and allow it to fuse into a continuous film. This pressure may vary over a relatively wide range but is preferably about 50 to 100 psi. Excessive pressure should be avoided since it may cause the foamed coating to ooze through the fabric, an undesirable phenomenon known as "strikethrough."

The temperature and time utilized in carrying out Step C is sufficient to cause finish curing of the coating. These conditions again may vary according to the type of foam utilized are are, for example, about 80° to about 200° C. for about 1 to 30 minutes and preferably about 120° to about 150° C. for a period of about 7 to 10 minutes. As in the foaming step, the time-temperature relationship should be such that the curing is effected in the minimum time interval without altering the nature of the fabric covering.

The following detailed examples illustrate preferred techniques for coating a fabric in accordance with the present invention.

EXAMPLE 1

A typical one-package formulation for use in the present invention consists of a mixture (on equivalent basis) of 1.0 adipodinitrile carbonate/0.2 polyester having three active OH groups (Witco's Fomrex 50)/0.5 polyester having 2.4 active OH groups (Mobay's Multron R-4)/0.2 dihydroxy ethyl aniline (Upjohn's Isonol C–100)/0.1 condensation product of epichlorohydrin and bisphenol–A having a molecular weight of 350–400 (Shell Chemical Company's Epon 828). One hundred parts of this blend was compounded with about three parts of thiotrope (Baker's MPA-60), 20 parts of barytes and 10 parts of pigment grade TiO$_2$ and was doctor bladed to a thickness of 8 to 10 mils on a teflon coated sheet. This coated teflon sheet was transferred to a 140° C. oven for 1 to 3 minutes to cause foaming of the coating. A piece of sheered, napped flannel (Milliken 0510) was placed over the foamed coating and the composite was transferred to a compression press heated to 140° C. The press was closed and brought up to contact pressure (50 to 100 psi), then immediately opened and the resulting laminate was transferred to a 140° C. oven for an additional 7 to 10 minutes to complete the curing. After cooling, the coated fabric was stripped from the release surface.

EXAMPLE II

A coated fabric was prepared in accordance with the procedure of Example I except that a one-package formulation consisting of a mixture (on equivalent basis) of 1.0 adipodinitrile carbonate/0.5 polyester/0.4 poly(oxytetramethylene)glycol having a molecular weight of 1,000 (sold by Quaker Oats under the trademark POLYMEG 1,000)/0.1 EPON 828 was substituted for the adipodinitrile carbonate-polyester system.

EXAMPLE III

A coated fabric was prepared in accordance with the procedure of Example I except that a one-package formulation consisting of a mixture (on equivalent basis) of 1.0 adipodinitrile carbonate/0.5 POLYMEG 1000/0.4 polyether (sold by Quaker Oats under the trademark POLYMEG 670)/0.1 EPON 828 was substituted for the adipodinitrile carbonate-polyester system.

The coated fabrics prepared in Examples I – III are permeable to air and cigarette smoke but are substantially resistant to water penetration. The coating materials are tough and resist mechanical abrasion and picking.

Example I illustrates the preparation of a foam fabric laminate in which the foam is prepared from a mixture of polyesters, Example II illustrates a fabric foam laminate in which the foam is prepared from a mixture of polyester and a polyether, and Example III illustrates a fabric foam laminate in which the foam is prepared from a mixture of polyethers.

While specific materials, conditions and techniques have been disclosed herein, and a specific working example of the best mode of operation has been set forth, it is to be understood that such are not to be considered limiting and that variations thereof will be apparent to one skilled in the art. Consequently, the present invention is to be limited only in accordance with the appended claims.

We claim:

1. A method for preparing a polyurethane coated fabric; comprising, coating a one-package cyclic nitrile carbonate/polyol composition to a release surface, heating the coated release surface at a temperature sufficient to cause foaming and partial curing of the coating; placing a substrate fabric over the foamed and partially cured coating in direct contact with the coating; applying pressure to the fabric-covered coating sufficient to crush the foam and fuse the same into a continuous film; heating the resulting compressed laminate to a temperature sufficient to complete curing of said coating; and stripping the coated fabric from said release surface.

2. A method in accordance with claim 1 wherein the cyclic nitrile carbonate is adipodinitrile carbonate.

3. A method in accordance with claim 1 wherein the polyol is a member of the group consisting of polyesters, polyethers, mixed polyester-polyethers and mixtures of these.

4. A method in accordance with claim 1 wherein the release surface is poly(tetrafluoroethylene).

5. A method in accordance with claim 1 wherein the coated release surface is foamed and partial cured at a temperature of about 80° to about 200° C. for about 1 to 30 minutes.

6. A method in accordance with claim 1 wherein the coated release surface is foamed and partial cured at a temperature of about 120° to about 150° C. for about 1 to 3 minutes.

7. A method in accordance with claim 1 wherein said pressure is about 50 to 100 psig.

8. A method in accordance with claim 1 wherein the compressed laminate is cured at a temperature of about 80° to about 200° C. for about 1 to about 30 minutes.

9. A method in accordance with claim 1 wherein the compressed laminate is cured at a temperature of about 120° to about 150° C. for about 7 to 10 minutes.

10. A method in accordance with claim 1 wherein the release surface is coated to a thickness of about 8 to 10 mils.

* * * * *